US 6,548,594 B2

(12) United States Patent
Luginsland et al.

(10) Patent No.: US 6,548,594 B2
(45) Date of Patent: Apr. 15, 2003

(54) RUBBER MIXTURES

(75) Inventors: Hans-Detlef Luginsland, Köln (DE); Andre Hasse, Linnich (DE)

(73) Assignee: Degussa AG, Dusseldorf (DE)

( * ) Notice: Subject to any disclaimer, the term of this patent is extended or adjusted under 35 U.S.C. 154(b) by 0 days.

(21) Appl. No.: 09/812,948

(22) Filed: Mar. 27, 2001

(65) Prior Publication Data

US 2001/0051684 A1 Dec. 13, 2001

(30) Foreign Application Priority Data

Mar. 28, 2000 (DE) .......................... 100 15 309

(51) Int. Cl.$^7$ .............................. C08L 9/00; C08K 3/36; C08K 5/548
(52) U.S. Cl. ................ 524/571; 524/262; 524/574; 524/575; 152/209.1; 152/564
(58) Field of Search .............. 152/209.1, 564; 524/571, 574, 575, 262

(56) References Cited

U.S. PATENT DOCUMENTS 4,474,908 A * 10/1984 Wagner
5,914,364 A * 6/1999 Cohen
6,211,278 B1 * 4/2001 Vanel
6,362,253 B1 3/2002 Durel

FOREIGN PATENT DOCUMENTS

EP 0 784 072 1/1997

OTHER PUBLICATIONS

Search Report for EPO Patent Appl. No. 01 10 6662 (Nov. 7, 2002).

* cited by examiner

Primary Examiner—David J. Buttner
(74) Attorney, Agent, or Firm—Pillsbury Winthrop LLP

(57) ABSTRACT

Rubber mixtures which comprise
(a) a rubber or a mixture of rubbers,
(b) a silicatic filler,
(c) an organosilane of the general formula (I)

$$R^1R^2R^3Si\text{—}R^4\text{—}SH \qquad (I)$$

(d) an alkylsilane of the general formula (II)

$$R^1R^2R^3Si\text{—}R^5 \qquad (II).$$

They are prepared by mixing the rubber or the mixture of rubbers, the silanes according to the formulae I and II and the silicatic filler in a mixing unit and adding the silanes according to the formulae I and II together or separately in succession. They can be used in shaped articles.

8 Claims, No Drawings

RUBBER MIXTURES

This application claims priority from German Application No. 100 15 309.7, filed on Mar. 28, 2000, the subject matter of which is hereby incorporated herein by reference.

BACKGROUND OF THE INVENTION

1. Field of the Invention

The invention relates to rubber mixtures, a process for their preparation and their use.

2. Background Information

It is known that hydrolysable organofunctionalized silanes which have the ability to react with fillers containing hydroxyl groups, such as, for example, naturally occurring and synthetic silicates, carbonates, glasses and metal oxides, find use for surface modification or adhesion promotion in many fields of use. In the rubber-processing industry, organopolysulfanesilanes (D 21 41 159) are used as adhesion promoters between the filler and rubber (D 22 55 577). The best known representative of this substance class is bis-triethoxysilylpropyltetrasulfane, known under the trade name Si 69 from Degussa-AG. Such organofunctionalized silanes are either used as pre-modified fillers (D 34 37 473) or the surface of the silicatic filler is modified with the liquid silane in situ during preparation of the mixture. Liquid organofunctional silanes are also used as solid mixtures, which are fixed to carriers, for rubber technology. By building up a chemical bond between the silicatic filler and the rubber matrix, good rubber properties, such as, for example, high moduli, high abrasion resistances and low hysteresis losses, are achieved. The additional hydrophobizing effect of the silane manifests itself in particular in low mixture viscosities, which allow processing of the rubber mixture.

The use of mercapto-functionalized organosilanes according to the formula $R^1R^2R^3Si-R^4-S-H$, wherein $R^1$, $R^2$, $R^3$ can be, identically or independently of one another: $C_1$ to $C_4$ alkyl, $C_1$ to $C_4$ alkoxy, preferably $R^1=R^2=R^3=$methoxy or ethoxy, $R^4$ can be $C_1$ to $C_6$ linear or branched alkylidene, preferably propyl, for rubber mixtures is known from U.S. Pat. No. 3,350,345 and F 2 094 859.

The mercapto-functionalized organosilanes show a higher coupling effectiveness compared with the organopolysulfanesilanes described above and can therefore be used in a significantly lower dosage. It is known that because of their very high scorch sensitivity (scorching) and consequently more difficult processability, the use of these silanes plays only a minor role in rubber technology (U.S. Pat. No. 4,002,594).

The high scorch sensitivity of these silanes can be improved significantly and reliable processing can thus be ensured by introduction of so-called protective groups for the mercapto function (D 2 035 778, WO 99/09036). The introduction of such protective groups reduces not only the scorch sensitivity but also the coupling yield, which must be compensated by a higher dosage. This is undesirable because of the high prices of such silanes.

EP 784 072 describes the use of a combination of the mercaptosilane and a short-chain functionalized silicone oil. The mercaptosilane function is shielded here such that the scorch sensitivity is reduced significantly. The silicone oil furthermore has a hydrophobizing action, which improves the processability of these mixtures. The limited availability and the high costs for the functionalized silicone oils are disadvantages of this process.

The use of mercaptosilane in combination with a short-chain alkylsilane, preferably methyltrimethoxysilane, is furthermore known from U.S. Pat. No. 4,474,908. Improved vulcanisation product data are indeed obtained in this combination, but the poor scorching properties and the deteriorated processability are disadvantages.

SUMMARY OF THE INVENTION

It is an object of the present invention to provide a rubber mixture which has outstanding processing properties (low viscosity, long scorch times) and exceptional vulcanization product data (e.g. high amplification ratio 300%/100% and low hysteresis loss).

The invention provides a rubber mixture, which is characterized in that this comprises (a) a rubber or a mixture of rubbers, (b) a silicatic filler, (c) an organosilane of the general formula (I)

wherein $R^1$, $R^2$, $R^3$ can be identical or different and consist of $C_1$ to $C_4$ alkyl or $C_1$ to $C_4$ alkoxy, preferably methoxy or ethoxy, $R^4$ consists of $C_1$ to $C_6$ linear or branched alkylidene, preferably propyl, and (d) an alkylsilane of the general formula (II)

wherein $R^1$, $R^2$, $R^3$ have the meaning as in formula I, $R^5$ consists of $C_{10}$–$C_{20}$ linear or branched alkylidene, preferably hexadecyl or octadecyl.

Natural rubber and/or synthetic rubbers can be used as the rubber. Preferred synthetic rubbers are described, for example, in W. Hofmann, Kautschuktechnologie [Rubber Technology], Genter Verlag, Stuttgart 1980. They can comprise, inter alia, polybutadiene (BR)

polyisoprene (IR)

styrene/butadiene copolymers with styrene contents of 1 to 60, preferably 5 to 50 wt. % (SBR)

isobutylene/isoprene copolymers (IIR)

butadiene/acrylonitrile copolymers with acrylonitrile contents of 5 to 60, preferably 10 to 50 wt. % (NBR)

ethylene/propylene/diene copolymers (EPDM)

and mixtures of these rubbers.

In a preferred embodiment, the rubbers can be vulcanizable with sulfur.

Precipitated silicas can be employed as the silicatic fillers.

The rubber mixtures can comprise 10 to 150 parts by wt. of silicatic filler, 0.02 to 4 parts by wt. of organosilane of the formula I and 0.02 to 10 parts by wt. of alkylsilane of the formula II, the parts by wt. being based on 100 parts by wt. of rubber.

The organosilane of the formula I can be employed in an amount of 1 to 4 wt. % and the alkylsilane of the formula II in an amount of 1 to 6 wt. %, based on the amount of filler employed.

The rubber mixtures according to the invention can comprise carbon black, for example furnace black, gas black, channel black, lamp black, thermal black, acetylene black, plasma black, inversion black, known from DE 195 21 565, Si-containing carbon black, known from WO 98/45361 or DE 196 13 796, or metal-containing carbon black, known from WO 98/42778, electric arc black and carbon blacks, which are by-products of a chemical production process. The carbon black can be activated by upstream reactions.

The rubber mixtures according to the invention can comprise further known rubber auxiliary substances, such as, for example, crosslinking agents, vulcanization accelerators, reaction accelerators or retardants, anti-ageing agents, stabilizers, processing auxiliaries, plasticizers, waxes, metal oxides and activators, such as triethanolamine, polyethylene glycol, hexanetriol.

The rubber auxiliary substances can be employed in conventional amounts, which depend, inter alia, on the intended use. Conventional amounts are, for example, amounts of 0.1 to 50 wt. %, based on the rubber.

Sulfur or organic sulfur donors can serve as crosslinking agents.

The rubber mixtures according to the invention can furthermore comprise vulcanization accelerators. Examples of suitable vulcanization accelerators are mercaptobenzothiazoles, sulfenamides, guanidines, thiurams, dithiocarbamates, thioureas and thiocarbonates. The vulcanization accelerators and sulfur can be employed in amounts of 0.1 to 10 wt. %, preferably 0.1 to 5 wt. %, based on the rubber employed.

The invention also provides a process for the preparation of the rubber mixtures according to the invention, which is characterized in that the rubber or the mixture of rubbers, the silanes according to the formulae I and II and the silicatic filler are mixed in a mixing unit and the silanes according to the formulae I and II are added together or separately in succession.

The mixing of the rubbers with the filler, optionally rubber auxiliary substances and the organosilanes can be carried out in conventional mixing units, such as roll mills, internal mixers and mixing extruders. Such rubber mixtures can conventionally be prepared in internal mixers, the rubbers, the filler, the organosilanes and the rubber auxiliary substances first being mixed in at 100 to 170° C. in one or several successive thermomechanical mixing stages. The sequence of addition and the time of addition of the individual components can have a decisive effect on the resulting mixture properties here. The crosslinking chemicals can conventionally be added to the rubber mixture obtained in this way in an internal mixer or on a roll mill at 40–110° C. and the mixture can be processed to the so-called crude mixture for the subsequent process steps, such as, for example, shaping and vulcanization.

The vulcanization of the rubber mixtures according to the invention can be carried out at temperatures of 80 to 200° C., preferably 130 to 180° C., optionally under a pressure of 10 to 200 bar.

The rubber mixtures according to the invention can be used for the production of shaped articles, for example for the production of pneumatic tires, tire treads, cable sheathings, hoses, drive belts, conveyor belts, roller coverings, tires, shoe soles, sealing rings and damping elements.

The invention also provides shaped articles obtainable from the rubber mixture according to the invention by vulcanization.

The rubber mixtures according to the invention have the advantage that the long-chain alkylsilanes effectively shield the mercapto function such that the scorching time is prolonged significantly, but the coupling effectiveness of the mercaptosilane is not reduced. As a result, the amount of mercaptosilane required can be set significantly lower than for conventional organopolysulfanesilanes. Furthermore, the use of the long-chain alkylsilane has the effect of a very good hydrophobization of the filler surface, which manifests itself in low mixture viscosities and therefore a very good processability.

DETAILED DESCRIPTION OF THE INVENTION

EXAMPLE 1

The recipe used for the rubber mixtures is given in table 1. The unit phr here means parts by weight per 100 parts of the crude rubber employed. The general process for the preparation of rubber mixtures and vulcanization products thereof is described in the following book: "Rubber Technology Handbook", W. Hofmann, Hanser Verlag 1994.

TABLE 1

| Substance | Ex. [phr] |
|---|---|
| 1st stage | |
| Buna VSL 5025-1 | 96 |
| Buna CB 24 | 30 |
| Ultrasil 7000 GR | 80 |
| ZnO | 3 |
| Stearic acid | 2 |
| Naftolen ZD | 10 |
| Vulkanox 4020 | 1.5 |
| Protector G35P | 1 |
| Silanes according to ex. | variable |
| 2nd stage | |
| Batch stage 1 | |
| 3rd stage | |
| Batch stage 2 | |
| Vulkacit D | 1 |
| Vulkacit CZ | 1.5 |
| Sulfur | variable |

The polymer VSL 5025-1 is an SBR copolymer of Bayer AG polymerized in solution and having a styrene content of 25 wt. % and a butadiene content of 75 wt. %. Of the butadiene 73% is linked as 1,2, 10% as cis-1,4 and 17% as trans-1,4. The copolymer comprises 37.5 phr oil and has a Mooney viscosity (ML 1+4/100° C.) of 50±4.

The polymer Buna CB 24 is a cis-1,4-polybutadiene (neodymium type) from Bayer AG with a cis-1,4 content of 97%, a trans-1,4 content of 2%, a 1,2 content of 1% and a Mooney viscosity of 44±5.

Naftolen ZD from Chemetall is used as the aromatic oil; Vulkanox 4020 is 6PPD from Bayer AG, and Protector G35P is an anti-ozonant wax from HB-Fuller GmbH. Vulkacit D (DPG) and Vulkacit CZ (CBS) are commercial products from Bayer AG.

Ultrasil 7000 GR is a readily dispersible precipitated silica from Degussa-AG with a BET surface area of 175 $m^2/g$. The silanes Si 69 (bis-triethoxysilylpropyltetrasulfane) and Si 216 (hexadecyltriethoxysilane), silane according to the formula II, are commercial products from Degussa-AG. MPTES (3-mercapropyltriethoxysilane), according to the formula I, is from Gelest/ABCR.

The rubber mixtures are prepared in an internal mixer in accordance with the mixing instructions in table 2.

TABLE 2

Stage 1

Settings

| | |
|---|---|
| Mixing unit | Werner & Pfleiderer E-type |
| Speed | 60 min$^{-1}$ |
| Plunger pressure | 5.5 bar |
| Empty volume | 1.58 L |
| Filling level | 0.56 |
| Flow temp. | 70° C. |

Mixing operation

| | |
|---|---|
| 0 to 1 min | Buna VSL 5025-1 + Buna CB 24 |
| 1 to 3 min | 1/2 silica, ZnO, stearic acid, Naftolen ZD, silanes |
| 3 to 4 min | 1/2 silica, anti-ageing |
| 4 min | clean |
| 4 to 5 min | mix |
| 5 min | clean |
| 5 to 6 min | mix and deliver |
| Batch temp. | 145–150° C. |
| Storage | 24 h at room temperature |

Stage 2

Settings

| | |
|---|---|
| Mixing unit | As in stage 1 except: |
| Speed | 80 min$^{-1}$ |
| Flow temp. | 80° C. |
| Filling level | 0.53 |

Mixing operation

| | |
|---|---|
| 0 to 2 min | break open batch stage 1 |
| 2 to 5 min | maintain batch temperature 150° C. by varying speed |
| 5 min | deliver |
| Batch temp. | 150° C. |
| Storage | 4 h at room temperature |

Stage 3

Settings

| | |
|---|---|
| Mixing unit | As in stage 1 except |
| Speed | 40 min$^{-1}$ |
| Filling level | 0.51 |
| Flow temp. | 50° C. |

Mixing operation

| | |
|---|---|
| 0 to 2 min | Batch stage 2, accelerator, sulfur |
| 2 min | deliver and form skin on laboratory roll mill (diameter 200 mm, length 450 mm, flow temperature 50° C.) |
| | Homogenization: cut in 3* left, 3* right and fold over, and turn over 8* for a wide roll nip (10 mm) and 3* for a narrow roll nip (3.5 mm) draw out a rolled sheet. |
| Batch temp. | 85–95° C. |

The methods for rubber testing are summarized in table 3.

TABLE 3

| Physical testing | Standard/Conditions |
|---|---|
| ML (1 + 4), 100° C. 3rd stage | DIN 53523/3, ISO 667 |
| Mooney scorch, 130° C. | DIN 53523, ISO 667 |
| t5 and t10 time [min] | |
| Vulcameter test, 165° C. | DIN 53529/3, ISO 6502 |
| Dmax - Dmin [dNm] | |
| T10% and t90% [min] | |
| Tensile test on ring, 23° C. | DIN 53504, ISO 37 |
| Tensile strength [MPa] | |
| Moduli [MPa] | |
| Elongation at break [%] | |
| Shore A hardness, 23° C. [SH] | DIN 53,505 |
| Viscoelastic properties, 0 and 60° C., 16 Hz, 50 N preliminary force and 25 N amplitude force | DIN 53 513, ISO 2856 |
| Storage modulus E' [MPa] | |
| Loss modulus E" [MPa] | |
| Loss factor tan δ[ ] | |
| Ball Rebound, 23° C. [%] | ASTM D 5308 |
| Goodrich flexometer, 0.250 inch stroke, 25 min, 23° C. | DIN 53533, ASTM D 623 A |
| Contact temperature [° C.] | |
| Puncture temperature [° C.] | |
| Permanent Set [%] | |
| DIN abrasion, 10 N force [mm$^3$] | DIN 53,516 |
| Dispersion [ ] | ISO/DIN 11345 |

Reference mixture (A) with 6.4 phr Si 69 is compared with mixtures (B) to (H) according to the invention. The amounts of Si 216, MPTES and sulfur are stated in table 4. The mixtures are arranged according to increasing Si 216/MPTES ratio.

Table 4 shows the result of the rubber testing.

TABLE 4

| | | (A) | (B) | (C) | (D) | (E) | (F) | (G) | (H) |
|---|---|---|---|---|---|---|---|---|---|
| Amount of Si 216 | [phr] | — | 0.78 | 1.60 | 2.80 | 2.80 | 4.82 | 4.00 | 2.80 |
| Amount of MPTES | [phr] | — | 2.20 | 3.20 | 3.88 | 2.20 | 2.20 | 1.20 | 0.52 |
| Si 216/MPTES | [ ] | — | 0.35 | 0.50 | 0.72 | 1.27 | 2.19 | 3.33 | 5.38 |
| Sulfur employed | [phr] | 1.50 | 1.75 | 2.50 | 1.75 | 1.75 | 1.75 | 2.50 | 1.75 |
| Crude mixture | | (A) | (B) | (C) | (D) | (E) | (F) | (G) | (H) |
| ML (1 + 4) at 100° C., 3rd stage | [ME] | 58 | 65 | 60 | 59 | 58 | 54 | 54 | 59 |
| Scorch time, t5 | [min] | 55 | 35 | 12 | 17 | 46 | 56 | 44 | 25 |
| Scorch time, t35 | [mm] | >60 | >60 | 23 | >60 | >60 | >60 | >60 | 46 |
| Dmax-Dmin | [dNm] | 18.7 | 15.6 | 14.5 | 9.4 | 11.2 | 9.3 | 14.5 | 20.8 |
| t10% | [min] | 1.6 | 1.2 | 1.1 | 1.0 | 1.7 | 2.0 | 2.5 | 1.1 |
| t90% | [min] | 44.9 | 49.4 | 29.3 | 47.1 | 48.7 | 43.8 | 36.1 | 36.1 |
| t80%–t20% | [min] | 18.9 | 23.7 | 13.1 | 22.5 | 24.0 | 21.2 | 17.8 | 13.5 |
| Vulcanization product | | (A) | (B) | (C) | (D) | (E) | (F) | (G) | (H) |

TABLE 4-continued

| | | | | | | | | | |
|---|---|---|---|---|---|---|---|---|---|
| Tensile strength | [MPA] | 15.6 | 9.1 | 13.4 | 15.1 | 14.6 | 14.8 | 15.8 | 15.5 |
| Modulus 100% | [MPA] | 1.6 | 1.6 | 2.0 | 1.3 | 1.5 | 1.2 | 1.5 | 1.4 |
| Modulus 300% | [MPA] | 8.2 | 7.9 | 13.3 | 7.6 | 8.7 | 6.8 | 9.0 | 6.1 |
| Modulus 300%/100% | [] | 5.0 | 5.0 | 6.5 | 5.7 | 5.8 | 5.7 | 5.9 | 4.5 |
| Elongation at break | [%] | 440 | 320 | 300 | 430 | 400 | 460 | 420 | 550 |
| Shore A hardness | [SH] | 62 | 59 | 60 | 51 | 55 | 51 | 56 | 62 |
| Ball Rebound 23° C. | [%] | 32.2 | 37.0 | 37.3 | 41.2 | 39.9 | 43.0 | 37.6 | 33.7 |
| DIN abrasion | [mm$^3$] | 77.8 | 69.7 | 61.2 | 62.9 | 64.6 | 77.6 | 84.7 | 107.8 |
| Dyn. Elasticity modulus E', 0° C. | [MPa] | 18.1 | 14.8 | 12.4 | 10.9 | 11.3 | 9.6 | 9.8 | 15.9 |
| Dyn. Elasticity modulus E', 60° C. | [MPa] | 7.7 | 7.0 | 6.4 | 5.7 | 6.1 | 5.3 | 5.5 | 7.0 |
| Dyn. Elasticity modulus E", 0° C. | [MPa] | 8.6 | 6.6 | 5.6 | 4.3 | 4.4 | 3.6 | 3.8 | 7.1 |
| Dyn. Elasticity modulus E", 60° C. | [MPa] | 1.0 | 0.9 | 0.6 | 0.8 | 0.9 | 0.6 | 0.7 | 0.9 |
| Loss factor tan δ, 0° C. | [–] | 0.472 | 0.445 | 0.455 | 0.392 | 0.390 | 0.377 | 0.389 | 0.449 |
| Loss factor tan δ, 60° C. | [–] | 0.132 | 0.124 | 0.097 | 0.144 | 0.145 | 0.118 | 0.136 | 0.132 |
| Dispersion | [–] | 9 | 9 | 9 | 8 | 9 | 9 | 9 | 9 |

Mixtures (A), (C), (D), (F), (G), (H) were vulcanized at δ 165° C. for 45 minutes each and mixtures (B), (E) for 60 minutes each.

The data in table 4 show that at Si 216/MPTES ratios of <1 the scorch times (scorch times t5 and t 10%) are too low to ensure reliable processing (mixtures (B) to (D)). On the other hand, at Si 216/MPTES ratios which are too high, the rubber-filler coupling yield decreases significantly, which manifests itself in a deterioration in the static data, such as moduli and DIN abrasion ((G) and (H)). The best rubber data are obtained with mixtures (E) and (F), which have, inter alia, low mixture viscosities, long partial vulcanization times, high moduli, low DIN abrasion values and low loss factors tan δ (60° C.).

EXAMPLE 2

The performance of rubber mixtures with an Si 216/MPTES ratio of 1.5 to 2.7 is demonstrated and the conclusions in example 1 are thus verified. The recipe and mixing instructions correspond to those in tables 1 and 2. 6.4 phr Si 69 and 1.5 phr sulfur are employed in reference mixture (I). The amounts of silane and sulfur of mixtures (J) to (M) are shown in table 5, as is the profile of technical values of the rubbers.

The mixtures are each vulcanized at 165° C. for 45 minutes.

TABLE 5

| | | (I) | (J) | (K) | (L) | (M) |
|---|---|---|---|---|---|---|
| Si 216 | [phr] | — | 2.4 | 4.0 | 4 | 4.0 |
| MPTES | [phr] | — | 1.6 | 2.24 | 1.8 | 1.48 |
| Si216/MPTES | [] | — | 1.5 | 1.8 | 2.2 | 2.7 |
| Sulfur | [phr] | 1.5 | 2.3 | 2.9 | 2.6 | 2.5 |
| Crude mixture | | | | | | |
| ML (1 + 4) | [ME] | 63 | 61 | 55 | 54 | 55 |
| Scorch time, t5 | [min] | 41 | 23 | 23 | 23 | 27 |
| Scorch time, t35 | [min] | >60 | >60 | 59 | 48 | 59 |
| Dmax-Dmin | [dNm] | 18.5 | 16.5 | 17.4 | 13.4 | 15.0 |
| t 10% | [min] | 1.8 | 1.6 | 2.0 | 2.1 | 2.4 |
| t 90% | [min] | 51.9 | 33.2 | 27.6 | 25.9 | 28.4 |
| Vulcanization product | | | | | | |
| Tensile strength | [MPa] | 12.1 | 13.6 | 11.2 | 13.9 | 12.5 |
| Modulus 100% | [MPa] | 1.7 | 1.8 | 1.9 | 1.7 | 1.7 |
| Modulus 300% | [MPa] | 8.0 | 9.9 | 10.6 | 10.4 | 9.3 |
| Modulus 300%/100% | [MPa] | 4.7 | 5.5 | 5.6 | 6.2 | 5.5 |
| Elongation at break | [%] | 380 | 360 | 310 | 350 | 360 |

TABLE 5-continued

| | | (I) | (J) | (K) | (L) | (M) |
|---|---|---|---|---|---|---|
| Shore A hardness | [SH] | 64 | 61 | 60 | 56 | 59 |
| Ball Rebound, 23° C. | [%] | 31.0 | 36.1 | 33.8 | 36.4 | 34.7 |
| DIN abrasion | [mm$^3$] | 76 | 75 | 90 | 82 | 89 |
| E', 0° C. | [MPa] | 22.0 | 12.2 | 12.7 | 11.2 | 12.6 |
| E', 60° C. | [MPa] | 7.9 | 6.4 | 6.7 | 6.1 | 6.3 |
| E", 0° C. | [MPa] | 10.3 | 5.2 | 5.8 | 4.9 | 5.5 |
| E", 60° C. | [MPa] | 1.1 | 0.7 | 0.6 | 0.5 | 0.6 |
| tan δ, 0° C. | [–] | 0.470 | 0.428 | 0.458 | 0.433 | 0.440 |
| tan δ, 60° C. | [–] | 0.141 | 0.104 | 0.086 | 0.086 | 0.100 |
| Dispersion | [–] | 8 | 8 | 8 | 8 | 8 |

The data in table 5 show that at Si 216/MPTES ratios of 1.5 to 2.7, mixtures (J) to (M), outstanding rubber properties are found. The low mixture viscosities and long partial vulcanization times ensure a good processability of the mixture. The high moduli and in particular the high amplification factor 300%/100% suggests a very high filler-rubber coupling yield. The DIN abrasion values are favourable and great advantages are to be seen in the low loss factors tan δ (60° C.), which correlate with the rolling resistance of a tire tread. The low mixture viscosities, Shore A hardnesses and tan δ (60° C.) values of mixtures (K) to (M) even allow room for a further increase in filler content, which can lead to an improvement in the wet antiskid properties.

EXAMPLE 3

Reference mixture (N) with 4.8 phr Si 69 and 0.65 phr sulfur is compared with mixtures (O) to (Q), which comprise MPTMS (mercaptopropyltrimethoxysilane) and MTMS (methyltrimethoxysilane), Si 203 or Si 216. The recipe is shown in table 6. The mixing instructions are analogous to those in table 2, with the difference that the vulcanization system of the 3rd stage is mixed in cold on the roll mill.

TABLE 6

| Substance | Ex. [phr] |
|---|---|
| 1st stage | |
| Krylene 1500 | 100 |
| Hisil 233 | 60 |
| Stearic acid | 1 |

TABLE 6-continued

| Substance | Ex. [phr] |
|---|---|
| Renopal NS | 15 |
| Vulkanox HS/LG | 1.5 |
| Silanes according to ex. | variable |
| 2nd stage | |
| Batch stage 1 | |
| 3rd stage | |
| Batch stage 2 | |
| ZnO | 4 |
| Vulkacit CZ | 1 |
| Vulkacit Thiuram C | 0.75 |
| Sulfur | variable |

Krylene 1500 is an emulsion SBR with 23.5% styrene units and a Mooney viscosity of 50±5 from Bayer AG. Hisil 233 from PPG Industries is a precipitated silica with a BET surface area of 155 m²/g. Renopal NS is a plasticizer from Fuchs Mineralöl-Werke Eschweiler. Vulkanox HS/LG is the anti-ageing agent TMQ from Bayer AG. Vulkacit Thiuram C is the accelerator TMTD from Bayer AG.

MPTMS and MTMS are distributed by Gelest/ABCR. Si 203 is a commercial product from Degussa-AG.

The amounts of silane and sulfur of mixtures (O) to (Q) are shown in table 7, as is the profile of technical values of the rubbers. The mixtures are each vulcanized at 165° C. for 25 minutes. The amounts of alkylsilanes are equimolar, based on the Si unit.

TABLE 7

| | | (N) | (O) | (P) | (Q) |
|---|---|---|---|---|---|
| Alkylsilane | | — | MTMS | Si 203 | Si 216 |
| Amount of alkylsilane | [phr] | — | 0.75 | 2.08 | 3.92 |
| Amount of MPTMS | [phr] | — | 0.75 | 0.75 | 0.75 |
| Sulfur employed | [phr] | 0.65 | 2.5 | 1.75 | 1.75 |
| Crude mixture | | | | | |
| Scorch time, t5 | [min] | 11 | 20 | 16 | 17 |
| Scorch time, t35 | [min] | 15 | 29 | 21 | 22 |
| ML (1 + 4) | [ME] | 75 | 91 | 73 | 63 |
| Dmax-Dmin | [dNm] | 14.6 | 41.3 | 17.9 | 15.8 |
| t 10% | [min] | 2.9 | 5.6 | 4.0 | 4.3 |
| t 90% | [min] | 14.6 | 15.8 | 13.9 | 13.6 |
| Vulcanization product | Unit: | | | | |
| Tensile strength | [MPa] | 22.7 | 8.2 | 17.3 | 18.3 |
| Modulus 100% | [MPa] | 1.9 | 1.7 | 1.9 | 2 |
| Modulus 300% | [MPa] | 9.3 | 7.7 | 8.8 | 9.7 |
| Modulus 300/100% | [-] | 4.9 | 4.5 | 4.6 | 4.9 |
| Elongation at break | [%] | 540 | 310 | 470 | 450 |
| Shore A hardness | [SH] | 62 | 67 | 64 | 61 |
| Ball Rebound (23° C.) | [%] | 54.2 | 52.5 | 52.2 | 56.1 |
| DIN abrasion | [mm³] | 80 | 100 | 96 | 99 |
| Contact temperature | [° C.] | 25 | 34 | 24 | 19 |
| Puncture temperature | [° C.] | 64 | 80 | 59 | 48 |
| Permanent Set | [%] | 6.6 | 9.9 | 5.0 | 7.9 |
| E' (° C.) | [MPa] | 13.0 | 17.9 | 13.2 | 10.3 |
| E' (60° C.) | [MPa] | 8.8 | 11.0 | 9.1 | 7.7 |
| E'' (° C.) | [MPa] | 3.0 | 4.5 | 3.2 | 2.1 |
| E'' (60° C.) | [MPa] | 1.0 | 1.8 | 1.2 | 0.7 |
| tan δ (° C.) | [-] | 0.232 | 0.252 | 0.246 | 0.206 |
| tan δ (60° C.) | [-] | 0.119 | 0.159 | 0.131 | 0.096 |

As is seen from table 7, mixture (O) with the short-chain alkylsilane MTMS shows a significantly higher Mooney viscosity and worsened vulcanization product data compared with reference mixture (N). Mixture (P) with Si 203 also drops with respect to mixture (N) (lower amplification ratio 300%/100% and a higher tan δ (60° C.). In contrast, mixture (Q) with the long-chain alkylsilane Si 216 is distinguished by a very good profile of properties. Compared with the reference mixture, the viscosity is low and the vulcanization product data, in particular the low tan δ (60° C.) value, are slightly superior.

It is shown in examples 1 and 2 that very good rubber data are obtained with mixture ratios of Si 216/MPTES in the range from 1 to 3. It is shown in example 3 that no satisfactory results are obtained with the use of short-chain alkylsilanes, such as methyltrimethoxysilane (MTMS) or propyltriethoxysilane (Si 203), instead of the long-chain Si 216.

EXAMPLE 4

Example 4 demonstrates that, while rubber mixtures having an Si 216/MPTES ratio of 0.5 to 1, but having a quantity of MPTES optimised to the filler content do indeed exhibit the weaknesses with regard to scorch resistance explained in Example 1, they do on the other hand exhibit excellent static and dynamic rubber data.

The recipe and mixing instructions correspond to those in Tables 1 and 2. 6.4 phr of Si 69 and 1.5 phr of sulfur are used in the reference mixture (R). The quantity of MPTES in the mixture according to the invention (S) is 2.4 phr, that of Si 216 is 1.6 phr and the quantity of sulfur is 2.3 phr. This corresponds to an Si 216/MPTES ratio of 0.66. Table 8 shows the technical data for the rubber. In addition to the tests listed in Table 3, viscoelastic (dynamic) properties are also determined at −20° C.

The mixtures are each vulcanised for 20 minutes at 165° C.

TABLE 8

| Crude mixtures | | (R) | (S) |
|---|---|---|---|
| ML (1 + 4) | [ME] | 60 | 61 |
| Scorch time, t5 | [min] | 33.45 | 13.35 |
| Scorch time, t35 | [min] | >60 | 22.1 |
| Dmax-Dmin | [dNm] | 16.4 | 13.4 |
| t 10 % | [min] | 2.0 | 1.2 |
| t 90 % | [min] | 15.8 | 19.7 |
| Tensile strength | [MPa] | 13.4 | 15.2 |
| Modulus 100% | [MPa] | 1.6 | 1.5 |
| Modulus 300% | [MPa] | 8.2 | 9.0 |
| Modulus 300%/100% | [-] | 5.1 | 6.0 |
| Elongation at break | [%] | 400 | 400 |
| Shore A hardness | [SH] | 60 | 55 |
| Ball rebound, 23° C. | [%] | 33.7 | 39.2 |
| DIN abrasion | [mm³] | 82 | 67 |
| E', −20° C. | [MPa] | 78.3 | 48.8 |
| E', 0° C. | [MPa] | 12.9 | 10.0 |
| E', 60° C. | [MPa] | 6.5 | 6.0 |
| E'', −20° C. | [MPa] | 56.6 | 44.2 |
| E'', 0° C. | [MPa] | 6.0 | 4.1 |
| E'', 60° C. | [MPa] | 0.8 | 0.6 |
| tan δ, −20° C. | [-] | 0.724 | 0.906 |
| tan δ, 0° C. | [-] | 0.463 | 0.461 |
| tan δ, 60° C. | [-] | 0.129 | 0.099 |
| Dispersion | [-] | 7 | 8 |

As is clearly evident from the data in Table 8, mixture (S) exhibits distinctly shorter scorch times (t 10%, Mooney scorch) than the reference mixture with Si 69. The mixture according to the invention (S) is distinguished by more advantageous modulus values, a greater amplification factor modulus 300%/100% and lower DIN abrasion. Moreover, tan δ at 60° C., which correlates with rolling resistance, is distinctly reduced (improved rolling resistance). The greatly reduced storage modulus E' at −20° C. furthermore indicates improved grip on ice, as is in particular required for winter tires.

What is claimed is:

1. A rubber mixture comprising
   (a) a rubber or a mixture of rubbers,
   (b) a silicatic filler,
   (c) 1 to 4 wt % based on the amount of filler of an organosilane of the general formula (I)

   $$R^1R^2R^3Si-R^4-SH \qquad (I)$$

wherein $R^1$, $R^2$, $R^3$ can be identical or different and consist of $C_1$ to $C_4$ alkyl or $C_1$ to $C_4$ alkoxy, $R^4$ consists of $C_1$ to $C_6$ linear or branched divalent hydrocarbon, and
   (d) 1 to 6 wt % based on the amount of filler of an alkylsilane of the general formula (II)

   $$R^1\ R^2R^3Si-R^5 \qquad (II)$$

wherein $R^1$, $R^2$, $R^3$ have the meaning as in formula I, and $R^5$ consists of $C_{16}-C_{20}$ linear or branched alkyl.

2. A rubber mixture according to claim 1, wherein $R^1$, $R^2$, $R^3$=methoxy or ethoxy, $R^4$=propyl, $R^5$=hexadecyl or octadecyl.

3. A pneumatic tire, tire tread, cable sheating, hose, drive belt, conveyor belt, roller covering, tire, shoe sole, sealing ring or damping element comprising the rubber mixture according to claim 1.

4. A process for the preparation of rubber mixtures according to claim 1, comprising the steps of mixing the rubber or the mixture of rubbers, the silanes according to the formulae I and II and the silicatic filler in a mixing unit and adding the silanes according to the formulae I and II together or separately in succession.

5. Shaped articles comprising the rubber mixture according to claim 1.

6. A shaped article obtained from a rubber mixture according to claim 1 by vulcanization.

7. A shaped article according to claim 6, that is a pneumatic tire.

8. A shaped article according to claim 6, that is a tire tread.

* * * * *